United States Patent
Mueller et al.

(10) Patent No.: US 9,533,606 B2
(45) Date of Patent: Jan. 3, 2017

(54) LOCKING DEVICE AND VEHICLE SEAT

(75) Inventors: Peter Mueller, Mackenbach (DE);
Volker Windecker, Sippersfeld (DE);
Stefan Haber, Pirmasens (DE); Kadir Yasaroglu, Mudanya/Bursa (TR); Silke Labuk, Weilerbach (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 416 days.

(21) Appl. No.: 14/112,214

(22) PCT Filed: Apr. 16, 2012

(86) PCT No.: PCT/EP2012/001627
§ 371 (c)(1),
(2), (4) Date: Dec. 27, 2013

(87) PCT Pub. No.: WO2012/152362
PCT Pub. Date: Nov. 15, 2012

(65) Prior Publication Data
US 2014/0306507 A1    Oct. 16, 2014

(30) Foreign Application Priority Data

May 6, 2011    (DE) .......................... 10 2011 101 283

(51) Int. Cl.
*B60N 2/44*    (2006.01)
*B60N 2/015*   (2006.01)
*B60N 2/36*    (2006.01)

(52) U.S. Cl.
CPC ............. *B60N 2/44* (2013.01); *B60N 2/01583* (2013.01); *B60N 2/366* (2013.01); *B60N 2/442* (2013.01)

(58) Field of Classification Search
CPC ........... B60N 2/44; B60N 2/366; B60N 2/442; B60N 2/01583

(Continued)

(56) References Cited

U.S. PATENT DOCUMENTS 6,547,302 B1 * 4/2003 Rubio .................... B60N 2/366
                                                   297/378.13
7,152,926 B2 * 12/2006 Wrobel .............. B60N 2/01541
                                                   297/378.13

(Continued)

FOREIGN PATENT DOCUMENTS

DE    10 2004 021 516 A1    11/2005
DE    1020040 21 516 A1     11/2005

(Continued)

OTHER PUBLICATIONS

International Search Report mailed Jul. 5, 2012 as received in corresponding International Application No. PCT/EP2012/001627.

(Continued)

*Primary Examiner* — Anthony D Barfield
(74) *Attorney, Agent, or Firm* — Foley & Lardner LLP

(57) ABSTRACT

A locking device for a vehicle seat has a latch which is mounted pivotably about a second axis and is intended for locking a counter element, with a clamping eccentric which is mounted pivotably about a first axis parallel to the second axis and, by interaction with a first functional surface of the latch, secures a locked state of the latch. In the locked state, the clamping eccentric acts in a spring-loaded manner on the first functional surface via a clamping surface. The clamping eccentric is moveable from the locking position thereof into the unlocking position thereof. A pretensioned compression spring is provided, which is supported at one end thereof on an arm of the clamping eccentric in a manner spring-loading the latter into the locking position thereof and, at the other end thereof, acting upon the latch in the unlocking direction.

8 Claims, 4 Drawing Sheets

Figure 1:
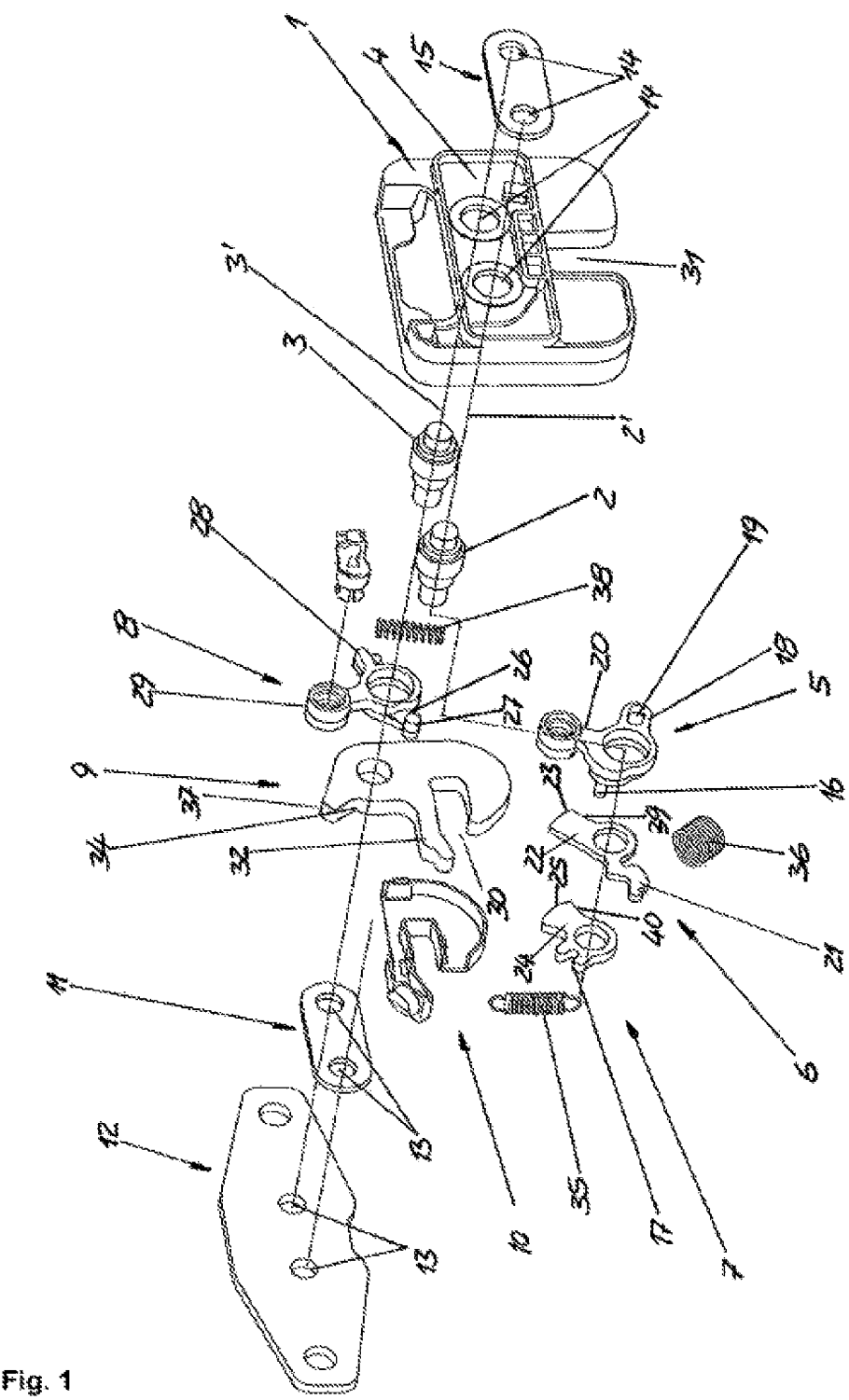

(58) Field of Classification Search
USPC .................................................. 297/378.13
See application file for complete search history.

(56) References Cited

U.S. PATENT DOCUMENTS

| | | | |
|---|---|---|---|
| 7,416,254 B2* | 8/2008 | Jennings | B60N 2/366 |
| | | | 297/378.13 X |
| 7,762,605 B2* | 7/2010 | Otsuka | B60N 2/01583 |
| | | | 297/378.13 |
| 2004/0007882 A1 | 1/2004 | Arabia, Jr. et al. | |

FOREIGN PATENT DOCUMENTS

| | | |
|---|---|---|
| DE | 10 2007 046 409 A1 | 10/2008 |
| JP | 2010-522660 | 7/2010 |

OTHER PUBLICATIONS

Office Action dated Nov. 27, 2014, in corresponding Korean Application No. 10-2013-7032344, and English translation, 16 pages.

* cited by examiner

LOCKING DEVICE AND VEHICLE SEAT

CROSS REFERENCE TO RELATED APPLICATIONS

The present application is a U.S. National Stage of International Application No. PCT/EP2012/001627, filed on Apr. 16, 2012, which claims the benefit of German Patent Application No. 10 2011 101 283.8, filed on May 6, 2011, the entire disclosures of all of which are incorporated herein by reference.

The invention relates to a locking device for a vehicle seat having the features of the preamble of claim 1. The invention also relates to a vehicle seat having the features of claim 11.

PRIOR ART

One possibility for using locking devices of this type consists in serving to attach a vehicle seat to the floor in a motor vehicle.

In the locked state, the clamping eccentric exerts a closing moment on the pawl via the clamping face.

DE 10 2007 016 409 A1 has disclosed a locking device of this type for a vehicle seat, which locking device comprises a pawl and a clamping eccentric.

US 2004/0 007 882 A1 discloses a locking device for a vehicle seat having a prestressed compression spring which acts with one end on an arm of the clamping eccentric and supports it in its locked location in a spring-loading manner.

Object

It is the object of the invention to provide a locking device of the type mentioned at the outset, which locking device requires a small amount of installation space and has a low weight.

Solution

According to the invention, this object is achieved by virtue of the fact that the clamping eccentric can be moved out of its locked location into its unlocked location, a prestressed compression spring being provided which is supported with its one end on an arm of the clamping eccentric so as to spring-load the latter into its locked location and loads the pawl in the unlocking direction with its other end.

As a result of this configuration, in addition to the function of the exertion of a closing moment on the pawl in the locked state, the clamping eccentric also fulfills the function of the ejection of the counterelement when the locking device is unlocked, with the result that an integrated ejection function, which reduces installation space, of the counterelement with high ejection force when the locking device is unlocked is produced. At the same time, however, the locking forces which act on the pawl during the pivoting in of the counterelement which is fixed to the vehicle are low.

In order to optimize the forces, a first lever arm L1 between the action point of the compression spring on the pawl and the second axis can be greater than a second lever arm L2 between the action point of the compression spring on the clamping eccentric and the first axis.

It leads to further optimization of the force relationships if a third lever arm L3 between the contact point of the first functional face on the clamping face and the second axis is greater than a fourth lever arm L4 between the contact point of the first functional face on the clamping face and the first axis.

If the ratio of third lever arm L3 to fourth lever arm L4 is greater here than the ratio of first lever arm L1 to second lever arm L2, a closing torque acts on the pawl.

In order to actuate the clamping eccentric, an unlocking slave can be mounted such that it can be pivoted by an actuating device counter to a spring force about the first axis from a locked condition into an unlocked condition, by way of which unlocking slave the clamping eccentric can be moved from its locked location into its unlocked location.

According to one advantageous development of the invention, an unlocking master is mounted such that it can be pivoted about the second axis counter to a spring force from a locked condition into an unlocked condition and is coupled via a driving coupling to the unlocking slave in such a way that the unlocking master is driven from its locked condition into its unlocked condition, or from the unlocked condition into the locked condition, by way of a pivoting movement of the unlocking slave from the locked condition into the unlocked condition, or from the unlocked condition into the locked condition.

If a catching eccentric is mounted such that it can be pivoted about the first axis and ensures a locked state of the pawl by way of interaction with the first functional face of the pawl, it being possible for the pawl to be supported in the locked state by a catching face of the catching eccentric, and it being possible for the catching eccentric to be moved between its locked position and its unlocked position by way of the unlocking slave which can be pivoted about the first axis, the catching eccentric supports, by way of the catching face, the pawl on its first functional face in the case of a crash when the locking device is locked.

It likewise leads to a closing torque which acts on the pawl if the clamping eccentric is spring-loaded in the direction of its locked location by way of of a prestressed tension spring. Furthermore, plays between the parts are eliminated as a result and disruptive rattling noises are therefore avoided.

If the clamping eccentric is mounted on the first axis such that it can be pivoted between the catching eccentric and the unlocking slave, and if the unlocking slave has a driver which extends parallel to the first axis, engages into a driving recess of the catching eccentric, and by way of which the clamping eccentric can be driven such that it can be pivoted in the direction of its unlocked location, the catching eccentric is driven in both pivoting directions by the unlocking slave with a compact construction, whereas the clamping eccentric is driven by the unlocking slave only in the direction of its unlocked location.

Here, in a simple construction which compensates for radial tolerances of the driver, the driving recess can be a driving fork.

It goes without saying that other suitable coupling variants can also be used.

The object is also achieved by a vehicle seat having the features of claim 11.

FIGURES AND EMBODIMENTS OF THE INVENTION

Figure 2:
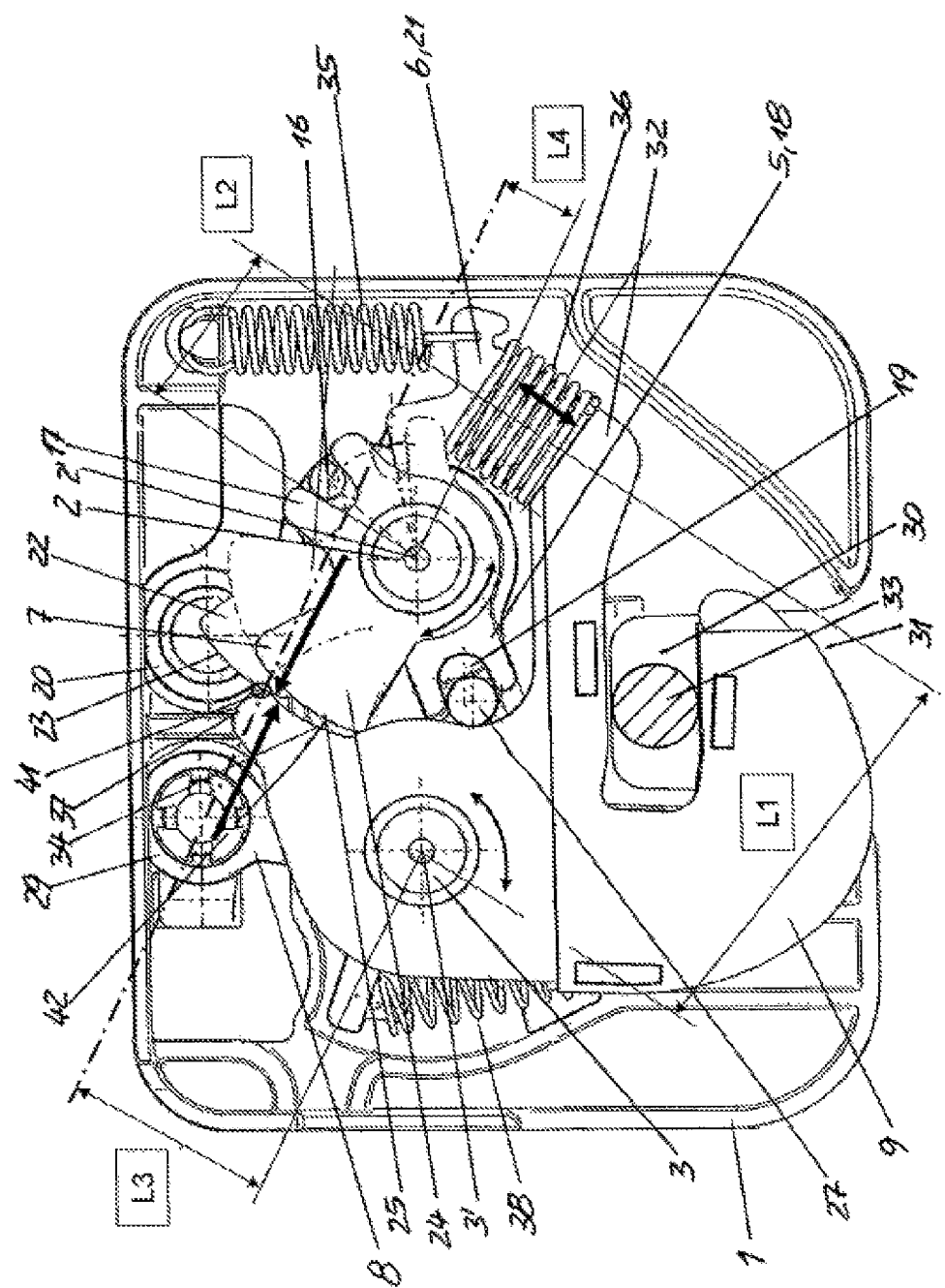
Figure 3:
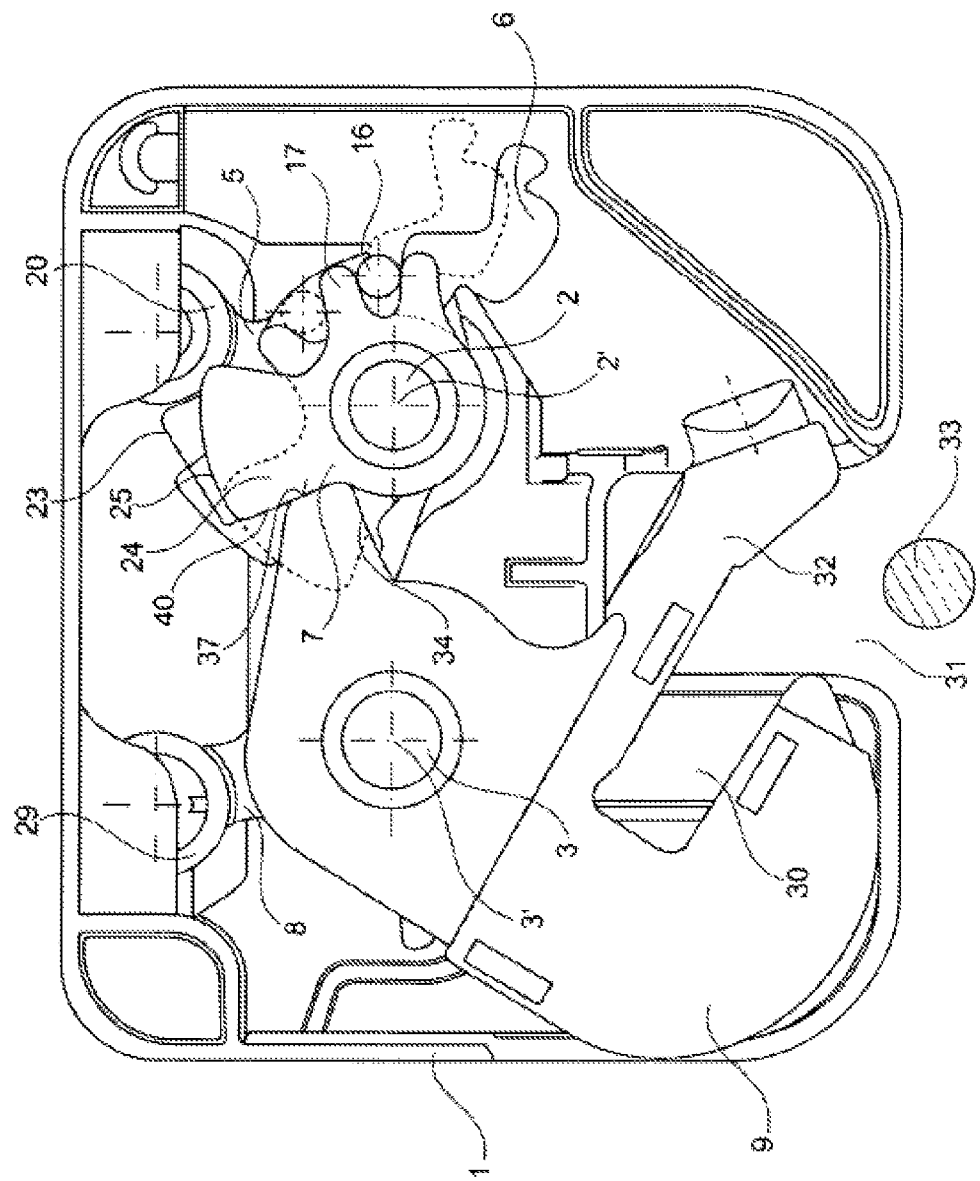
Figures 4, 5:
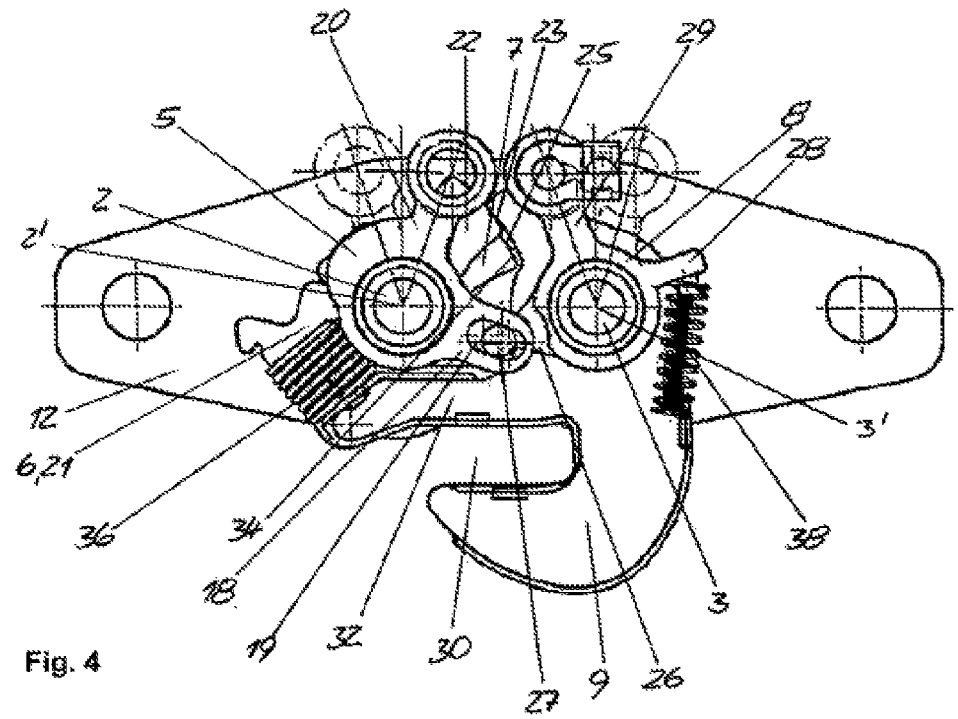

In the following text, the invention is explained in greater detail using one advantageous exemplary embodiment which is shown in the drawings. However, the invention is not restricted to said exemplary embodiment. In the drawings:

FIG. 1 shows an exploded illustration of a locking device,

FIG. 2 shows a front-side inner view of the locking device according to FIG. 1 in the locked condition, FIG. 3 shows a front-side inner view of the locking device according to FIG. 1 in the unlocked condition, FIG. 4 shows a rear-side inner view of the locking device according to FIG. 1 in the locked condition, and FIG. 5 shows a front-side inner view of the locking device according to FIG. 1 in the locked condition without a pawl.

The locking device which is shown is arranged in a floor region of a vehicle seat and has a cup-like housing 1, in which a first axle pin 2 and a second axle pin 3 are arranged fixedly parallel to one another so as to extend transversely with respect to the floor 4 of the housing 1.

An unlocking slave 5, a clamping eccentric 6 and a catching eccentric 7 are mounted on the first axle pin 2 parallel to one another such that they can be pivoted about a first axis 2'.

An unlocking master 8 and a pawl 9 are mounted on the second axle pin 3 parallel to one another such that they can be pivoted about a second axis 3', a cover 10 being clipped onto the pawl 9.

Via a first coupling plate 11, an adapter plate 12 bears against the housing 1 so as to extend transversely over the opening of the housing.

The first axle pin 2 and the second axle pin 3 are mounted with their free ends in bearing holes 13 of the first coupling plate 11 and the adapter plate 12 and in bearing holes 14 of the floor 4 and a second coupling plate 15 which bears against the outer side of the floor 4.

The unlocking slave 5 has a journal-like driver 16 which extends parallel to the first axle pin 2 beyond the clamping eccentric 6 so as to protrude into a driving fork 17 of the catching eccentric 7.

Lying substantially diametrically opposite the driver 16, the unlocking slave 5 has a radially directed unlocking slave arm 18, in the free end region of which a radially extending coupling slot 19 is formed.

A slave actuating arm 20 of the unlocking slave 5 extends radially at approximately 90 degrees with respect to the unlocking slave arm 18.

The clamping eccentric 6 has a substantially radially extending spring action arm 21 and, diametrically with respect thereto, a clamping face arm 22 which has a clamping face 23 at its free end.

Extending radially at approximately 90 degrees with respect to the driver fork 17, the catching eccentric 7 has a catching face arm 24 which has a catching face 25 at its free end.

The unlocking master 8 and the unlocking slave 5 are arranged on the second axle pin 3 and the first axle pin 2 so as to lie opposite one another in one plane.

The unlocking master 8 has an unlocking master arm 26 which extends radially to the outside in the direction toward the unlocking slave 5. The unlocking master arm 26 carries a coupling journal 27 which extends parallel to the second axle pin 3 and engages into the coupling slot 19 of the unlocking slave 5.

A spring supporting arm 28 of the unlocking master 8 extends radially so as to lie diametrically opposite the unlocking master arm 26. Extending radially transversely with respect to the unlocking master arm 26 and with respect to the spring supporting arm 28, the unlocking master 8 has a master actuating arm 29.

The pawl 9 has a hook throat 30 which interacts with a pin 33, as counterelement, which is arranged fixedly, for example, on a floor of a vehicle, and, in the locked state of the locking device, perpendicularly crosses a pin receptacle 31 which is formed in the housing 1. In the open state, the hook throat 30 opens obliquely toward the pin receptacle 31.

The hook throat 30 is delimited at the top by a finger 32 of the pawl 9, the width, defined in this way, of the hook throat 30 being slightly greater than the diameter of the pin 33.

Furthermore, the pawl 9 has a first functional face 34 which, in the locked condition, points approximately in the direction of the second axle pin 3. The first functional face 34 is configured, for example, to be concave and curved in a circularly annular manner.

The clamping eccentric 6 and the catching eccentric 7 in each case have a smaller width than the pawl 9 and are both arranged so as to lie opposite the pawl 9.

The clamping eccentric 6 is prestressed toward the pawl 9 by way of a tension spring 35 which acts between the housing and the clamping eccentric 6.

In the locked state, the clamping eccentric 6 exerts a closing moment on the pawl 9 via the clamping face 23 which is curved eccentrically with respect to the first axle pin 3 and is in non-selflocking contact with the first functional face 34. The clamping face 23 is configured, for example, to be convex and curved in a circularly annular manner.

The catching face 25 of the catching eccentric 7 is situated in the vicinity of the clamping face 23, but spaced apart from the first functional face 34 in the locked state. The catching face 25 is configured, for example, to be convex and curved in a circularly annular manner. In the case of a crash when the pawl 9 possibly experiences an opening moment and presses the clamping eccentric 6 away, the catching face 25 comes into contact with the first functional face 34 in order to support the pawl 9 and in order to prevent the latter from opening.

The catching eccentric 7 pivots away from the pawl 9 as a result of movement by way of an actuating device of the slave actuating arm 20 or the master actuating arm 29 which is coupled to the former from the locked state (FIGS. 2, 4 and 5) into the unlocked state (FIG. 3). As a result, the catching face 25 moves away from the first functional face 34.

Via the driver 16, the catching eccentric 7 drives the clamping eccentric 6 after a small idle stroke. The pawl 9 is then no longer secured.

Here, the pawl 9 is moved suddenly into its unlocked condition by way of a prestressed compression spring 36 which loads the clamping eccentric 6 in the direction of its locked location and with its one end and loads the pawl 9 in the unlocking direction with its other end, and, as a result, the pin 33 which is situated in the hook throat 30 and the pin receptacle 31 is ejected out of the hook throat 30 and the pin receptacle 31 by the finger 32.

Here, the pawl is pushed past the clamping eccentric 6 and past the catching eccentric 7 by way of a functional face 37 which is configured substantially transversely with respect to the first functional face 34.

Since the first lever arm L1 between the action point of the compression spring 36 on the pawl 9 and the second axis 3' is greater than the second lever arm L2 between the action point of the compression spring 36 on the clamping eccentric 6 and the first axis 2', the ejection force which is exerted on the pin 33 by the pawl 9 is relatively high. The actuating force for moving the slave actuating arm 20 or the master actuating arm 29 is comparatively low.

The compression spring 36 acts with the same magnitude of its force both on the pawl 9 and on the clamping eccentric 6. As a result of the different length of the first lever arm L1 and the second lever arm L2, a greater opening torque acts on the pawl 9 than a closing torque on the clamping eccentric 6.

The pawl 9 and clamping eccentric 6 are supported mutually at a contact point 41. As a result of the third lever arm L3 between the contact point 41 and the second pin 3' and the fourth lever arm L4 between the contact point 41 and the first axis 2', contact forces are produced by the torques which act on the basis of the force of the compression spring 36. Here, the third lever arm L3 is greater than the fourth lever arm L4. As a result, the contact force of the clamping eccentric 6 on the pawl 9 is greater than the counterforce of the pawl 9 on the clamping eccentric 6.

As a result of the fact that the ratio of third lever arm L3 to fourth lever arm L4 is greater than the ratio of first lever arm L1 to second lever arm L2, a closing torque acts effectively on the pawl 9.

If the loading in the unlocking direction by slave actuating arm 20 or master actuating arm 29 is ended, a second prestressed compression spring 38 between the spring supporting arm 28 and housing 1 presses the unlocking master 8 and the unlocking slave 5 which is coupled to it in the locking direction.

Here, by way of the tension spring 35, the clamping eccentric 6 is pressed against the second functional face 37 and bears with a bearing face 39 against the second functional face 37, the surface perpendicular of the second functional face 37 and the bearing face 39 running in front of the center of the second axle pin 3 and the hook throat 30. The clamping eccentric 6 therefore exerts an opening moment on the pawl 9 via the bearing face 39, which opening moment holds said pawl 9 open.

The catching eccentric 7 follows the movement of the clamping eccentric 6. The catching eccentric 7 has a bearing face 40 which is normally at a small spacing 42 from the second functional face 37 in the locked state and comes into contact with the second functional face 37 only in the case of a crash. The surface perpendicular of the bearing face 40 also runs in front of the center of the second axle pin 3 and the hook throat 30. The pin 33 which is fixed to the vehicle is pressed against the housing by way of the closing force of the clamping eccentric 6, which closing force acts on the pawl 9.

When the pin 33 passes again into the pin receptacle 31 and into contact with the finger 32, the pin 33 presses the pawl 9 in the locking direction.

As a result of the arrangement of the compression spring 36 between the pawl 9 and clamping eccentric 6, only comparatively low locking forces are required which act on the pawl 9 when the vehicle-side pin 33 is pivoted in.

Here, the second functional face 34 of the pawl 9 pivots away from the catching eccentric 7 and the clamping eccentric 6.

Here, the clamping eccentric 6 is pivoted into its locked condition by way of the tension spring 35 and the compression spring 36. Here, the clamping eccentric 6 also loads the driver 16 which likewise pivots the catching eccentric 7 into its locked condition.

It goes without saying that the locking device can be arranged at any point of a vehicle seat and can interact with a counterelement of a vehicle.

The features which are disclosed in the above description, the claims and the drawings can be of significance both individually and in combination for the implementation of the invention in its various refinements.

LIST OF DESIGNATIONS

1 Housing
2 First axle pin
2' First axis
3 Second axle pin
3' Second axis
4 Floor
5 Unlocking slave
6 Clamping eccentric
7 Catching eccentric
8 Unlocking master
9 Pawl
10 Cover
11 First coupling plate
12 Adapter plate
13 Bearing holes
14 Bearing holes
15 Second coupling plate
16 Driver
17 Driver fork
18 Unlocking slave arm
19 Coupling slot
20 Slave actuating arm
21 Spring action arm
22 Clamping face arm
23 Clamping face
24 Catching face arm
25 Catching face
26 Unlocking master arm
27 Coupling journal
28 Spring supporting arm
29 Master actuating arm
30 Hook throat
31 Pin receptacle
32 Finger
33 Pin
34 First functional face
35 Tension spring
36 Compression spring
37 Second functional face
38 Second compression spring
39 Bearing face
40 Bearing face
41 Contact point
42 Spacing
L1 First lever arm
L2 Second lever arm
L3 Third lever arm
L4 Fourth lever arm

The invention claimed is:

1. A locking device for a vehicle seat, comprising:
a pawl which is mounted such that it can be pivoted about a second axis in order to lock a counterelement;
a clamping eccentric which is mounted such that it can be pivoted about a first axis which is parallel to the second axis and secures a locked state of the pawl by interaction with a first functional face of the pawl,
the clamping eccentric acting in a spring-loaded manner on the first functional face via a clamping face in the locked state, the clamping eccentric exerting a closing moment on the pawl in the locked state,
wherein the clamping eccentric can be moved out of its locked location into its unlocked location; and a prestressed compression spring being provided which is supported with its one end on an arm of the clamping eccentric so as to spring-load the latter into its locked location and loads the pawl in the unlocking direction with its other end, wherein a first lever arm between the action point of the compression spring on the pawl and the second axis is greater than a second lever arm between the action point of the compression spring on the clamping eccentric and the first axis, wherein a third lever arm between the contact point of the first functional face on the clamping face and the second axis is greater than a fourth lever arm between the contact point of the first functional face on the clamping face and the first axis, wherein the ratio of third lever arm to fourth lever arm is greater than the ratio of first lever arm to second lever arm.

2. The locking device as claimed in claim 1, wherein an unlocking slave is mounted such that it can be pivoted about the first axis counter to a spring force from a locked condition into an unlocked condition, by way of which unlocking slave the clamping eccentric can be moved from its locked location into its unlocked location.

3. The locking device as claimed in claim 2, wherein an unlocking master is mounted such that it can be pivoted about the second axis counter to a spring force from a locked condition into an unlocked condition and is coupled via a driving coupling to the unlocking slave in such a way that the unlocking master is driven from its locked condition into its unlocked condition by way of a pivoting movement of the unlocking slave of the unlocking master from the locked condition into the unlocked condition.

4. The locking device as claimed in claim 3, wherein the unlocking slave is driven from its locked condition into its unlocked condition by way of a pivoting movement of the unlocking master from the locked condition into the unlocked condition.

5. The locking device as claimed in claim 1, wherein a catching eccentric is mounted such that it can be pivoted about the first axis and secures a locked state of the pawl by way of interaction with the first functional face of the pawl, it being possible for the pawl to be supported in the locked state by a catching face of the catching eccentric, and it being possible for the catching eccentric to be moved between its locked position and its unlocked position by way of the unlocking slave which can be pivoted about the first axis.

6. The locking device as claimed in claim 5, wherein the clamping eccentric is mounted such that it can be pivoted on the first axis between the catching eccentric and the unlocking slave, and the unlocking slave has a driver which extends parallel to the first axis, engages into a driving recess of the catching eccentric, and by way of which the clamping eccentric can be driven pivotably in the direction of its unlocked location.

7. The locking device as claimed in claim 1, wherein the clamping eccentric is spring-loaded in the direction of its locked location by a prestressed tension spring.

8. A vehicle seat, comprising at least one locking device as claimed in claim 1.

* * * * *

UNITED STATES PATENT AND TRADEMARK OFFICE
CERTIFICATE OF CORRECTION

PATENT NO. : 9,533,606 B2  
APPLICATION NO. : 14/112214  
DATED : January 3, 2017  
INVENTOR(S) : Peter Mueller et al.

Page 1 of 1

It is certified that error appears in the above-identified patent and that said Letters Patent is hereby corrected as shown below:

On the Title Page

Page 2, item (56) (References cited – Foreign Patent Documents), first mentioned reference should read as follows:

DE 10 2007 016 409 A1

Signed and Sealed this  
Fourteenth Day of March, 2017

Michelle K. Lee  
*Director of the United States Patent and Trademark Office*